(12) United States Patent
Seo et al.

(10) Patent No.: US 8,279,937 B2
(45) Date of Patent: Oct. 2, 2012

(54) CORRECTING MOVING IMAGE WAVERING

(75) Inventors: Kang Hoon Seo, Seoul (KR);
Myung-Soo Lee, Seoul (KR)

(73) Assignee: Core Logic, Inc., Seoul (KR)

( * ) Notice: Subject to any disclaimer, the term of this patent is extended or adjusted under 35 U.S.C. 154(b) by 430 days.

(21) Appl. No.: 12/428,385

(22) Filed: Apr. 22, 2009

(65) Prior Publication Data

US 2009/0296824 A1 Dec. 3, 2009

(30) Foreign Application Priority Data

Apr. 22, 2008 (KR) ........................ 10-2008-0037172

(51) Int. Cl.
*H04N 7/12* (2006.01)
*H04N 11/02* (2006.01)
*H04N 11/04* (2006.01)
*H04N 9/74* (2006.01)

(52) U.S. Cl. ......... 375/240.24; 375/240.16; 375/240.26; 375/240.27; 348/581

(58) Field of Classification Search .................. None
See application file for complete search history.

(56) References Cited

U.S. PATENT DOCUMENTS

| | | | |
|---|---|---|---|
| 5,563,652 A | 10/1996 | Toba et al. | |
| 6,418,166 B1* | 7/2002 | Wu et al. | 375/240.12 |
| 7,143,432 B1* | 11/2006 | Brooks et al. | 725/105 |
| 7,869,505 B2* | 1/2011 | Rodriguez et al. | 375/240.12 |
| 2004/0201706 A1 | 10/2004 | Shimizu et al. | |
| 2006/0209956 A1* | 9/2006 | Tsai et al. | 375/240.12 |
| 2007/0064977 A1* | 3/2007 | Nagata | 382/107 |
| 2007/0121731 A1* | 5/2007 | Tanizawa et al. | 375/240.24 |
| 2007/0133682 A1* | 6/2007 | Arai et al. | 375/240.16 |
| 2007/0133685 A1* | 6/2007 | Seong et al. | 375/240.16 |

FOREIGN PATENT DOCUMENTS

| | | |
|---|---|---|
| JP | 2007-088611 A | 4/2007 |
| KR | 10-0314104 B1 | 2/2002 |
| KR | 2004-0060462 A | 7/2004 |
| KR | 2007-0081589 A | 8/2007 |

* cited by examiner

*Primary Examiner* — Joseph Ustaris
*Assistant Examiner* — Kevin McInnish
(74) *Attorney, Agent, or Firm* — Nath, Goldberg & Meyer; Joshua B. Goldberg; Stanley N. Protigal

(57) ABSTRACT

Techniques, apparatus and system for correcting moving image wavering are disclosed. An apparatus includes a selecting unit to select at least one reference macroblock from an input image of a first frame and to select at least one search area from an input image of a second frame. The selected at least one search area corresponds to the at least one reference macroblock. The apparatus includes an operating unit to communicate with the selecting unit and to perform a statistical operation by matching the at least one reference macroblock of the first frame to each of search blocks included in the at least one search area of the second frame. The apparatus comprises a vector calculating unit to communicate with the operating unit and to calculate a motion vector to correct an output image of the second frame based on a resultant value of the statistical operation.

19 Claims, 14 Drawing Sheets

US 8,279,937 B2

CORRECTING MOVING IMAGE WAVERING

CLAIM OF PRIORITY

This Nonprovisional application claims priority under 35 U.S.C. §119(a) to Korean Patent Application No. 10-2008-0037172 filed in Republic of Korea on Apr. 22, 2008, the entire contents of which are hereby incorporated by reference.

BACKGROUND

The present specification relates to correcting moving image wavering. In general, digital image capturing devices such as a digital camcorder, a digital camera, and the like, successively captures still images of 15 to 30 frames per second and displays the captured images via a display unit, e.g., a liquid crystal display (LCD) and the like, to show a user a moving image. Capturing moving images (i.e., video) by using the digital image capturing device inevitably accompanies an unpredictable motion, wobbling or waving (e.g., a panning and tilting phenomenon) by the user in contact with the digital image capturing device, so without a fixing means such as a tripod and the like, it is not easy to maintain a physically stable image capturing condition. Such unstableness in the physical image capturing state causes distortion of captured images. In addition, in case of a digital image capturing device using a complementary metal-oxide semiconductor (CMOS) module, e.g., a mobile terminal, image distortion may occur due to fine wobbling in rolling a shutter.

Such image distortion may become severe by the motion of the user moving along a path of action of a subject, wobbling of the digital image capturing device, and unstableness from wavering. As the number of frames captured per second is small, the interpolation distance according to the wobbling or wavering between frames is increased, so the unstableness of the captured image the user may feel is aggravated.

To correct moving image wavering of the digital image capturing device, optical wavering correction and nonoptical wavering correction can be performed. The optical wavering correction technique provides a device for basically overcoming wobbling or wavering with respect to an image inputted via the CMOS module to the digital image capturing device to prevent moving image wavering. For example, the optical wavering correction employs a gyro sensor, so that when a lens of the digital image capturing device moves in capturing moving images, the gyro sensor physically shifts the center of the lens in the opposite direction of the movement of the lens. However, for such optical wavering correction, the digital image capturing device should necessarily have an additional device to perform the corresponding function, resulting in an increase in the production costs and unit cost of products as well as a size of the products.

The nonoptical wavering correction technique is used to correct a captured image at a level of hardware or software in a chip state. For example, a motion vector of a movement (wavering or wobbling)-generated captured image is calculated and an offset of the captured image is adjusted by a corresponding amount to correct the image.

SUMMARY

Techniques, apparatus and systems are described for correcting moving image wavering capable of effectively correcting a distorted image caused from wavering and significantly reducing the amount of calculation.

In one aspect, an apparatus for correcting moving image wavering includes a selecting unit to select at least one reference macroblock from an input image of a first frame and to select at least one search area from an input image of a second frame. The selected at least one search area corresponds to the at least one reference macroblock selected from the input image of the first frame. The apparatus includes an operating unit to communicate with the selecting unit and to perform a statistical operation by matching the at least one reference macroblock of the first frame to each of search blocks included in the at least one search area of the second frame. The apparatus comprises a vector calculating unit to communicate with the operating unit and to calculate a motion vector to correct an output image of the second frame based on a resultant value of the statistical operation.

Implementations can optionally include one or more of the following features. The at least one search area can include multiple separated areas spaced apart by a distance from a center of the input image of the second frame. The at least one reference macroblock of the first frame can be included in at least one search area of the first frame, and the at least one search area of the first frame and the at least one search area of the second frame can be positioned at the same coordinates in the input image. The selecting unit can be configured to store pixel data of the reference macroblock of the first frame and pixel data of the search area of the second frame in a memory. The operating unit can include a first input unit to load the pixel data of the reference macroblock of the first frame stored in the memory. The operating unit can include a second input unit to load the pixel data of the search area of the second frame stored in the memory. The operating unit can include a statistical operation unit to communicate with the first input unit and the second input unit. The statistical operation unit is configured to calculate an operation matrix by performing the statistical operation while shifting the reference macroblock of the first frame in a vertical or horizontal direction such that the reference macroblock corresponds to each search block included in the search area of the second frame, and stores the calculated operation matrix in the memory.

Implementations can optionally include one or more of the following features. The apparatus can include a controller to communicate with the selecting unit and the operating unit. The controller can be configured to calculate pixel data of a particular macroblock of the first frame and pixel data of a macroblock of the second frame positioned at the same coordinates as the particular macroblock of the first frame, and control the statistical operation performed by the operating unit based on the calculated information. The particular macroblock can include a reference macroblock. Also, the controller can include a subtraction operation unit to load the pixel data of the reference macroblock of the first frame and pixel data of a reference macroblock of the second frame and calculate each difference value between pixel values of the reference macroblock of the first frame and the reference macroblock of the second frame. The controller can include a position information calculation unit to communicate with the subtraction operation unit to calculate position information of pixels whose difference value is a pre-set reference value or larger. The controller can include a target controller to communicate with the position information calculation unit to control the operating unit to perform the statistical operation only on the pixels corresponding to the calculated position information among pixels of the reference macroblock of the first frame.

Implementations can optionally include one or more of the following features. The particular macroblock can include a reference macroblock. Also, the controller can include a subtraction operation unit to load the pixel data of the reference macroblock of the first frame and pixel data of a reference macroblock of the second frame and calculate each difference value between pixel values of the reference macroblock of the first frame and the reference macroblock of the second frame. The controller can include a position information calculation unit to communicate with the subtraction operation unit to calculate position information of a pixel whose different value is the same as or larger than a pre-set first reference value. The controller can include a rate calculation unit to communicate with the subtraction operation unit to calculate a rate of the pixel whose difference value is the same as or larger than the pre-set first reference value, in the reference macroblock. Further, the controller can include a target controller to communicate with the position information calculation unit and the rate calculation unit to control the operating unit to perform the statistical operation on only pixels corresponding to the position information among the pixels of the reference macroblock of the first frame when detecting that the calculated rate is smaller than a pre-set second reference value, and control the operating unit to perform the statistical operation on all the pixels of the reference macroblock of the first frame when detecting that the rate is the same as or larger than the pre-set second reference value. The apparatus can include a controller to communicate with the selecting unit and the operating unit to calculate pixel data of a particular macroblock of the first frame and pixel data of a macroblock of a preceding frame of the first frame positioned at the same coordinates as the particular macroblock of the first frame, and control the statistical operation performed by the operating unit based on the calculated information.

Implementations can optionally include one or more of the following features. The apparatus can include an input processing unit to communicate with the selecting unit to receive images of the first and second frames from an external source, downsize the received images, and convert pixel values of the downsized images into gray level values to generate the input image of the first frame and the input image of the second frame. The input processing unit can include an image receiving unit to receive the images of the first and second frames from an image capturing unit. The input processing unit can include an input scaler unit to communicate with the image receiving unit to lower resolution of the received images of the first and second frame. Further, the input processing unit can include an information conversion unit to communicate with the input scaler unit to convert the pixel values of the images processed by the input scaler unit into the gray level values. The apparatus can include an output scaler unit to receive the images of the first and second frames from an external source and downsize the received images into a size of the output image of the second frame. The apparatus can include a correcting unit to communicate with the output scaler unit to correct the output image of the second frame downsized by the output scaler unit based on the calculated motion vector. The vector calculating unit can be configured to detect a point having a minimum value from the operation matrix calculated through the statistical operation to calculate position information of a matching block among the search blocks included in the at least one search area of the second frame, and calculate the motion vector based on the position information of the calculated matching block. The vector calculating unit can use a spiral searching method to search the value of the point in a spiral direction from a central point of the operation matrix in order to detect the point having the minimum value from the operation matrix.

In another aspect, a method for correcting moving image wavering, includes selecting at least one reference macroblock from an input image of a first frame. Also, the method includes selecting at least one search area from an input image of a second frame, wherein the at least one search area corresponds to the at least on reference macroblock. The method includes performing a statistical operation by matching the at least one reference macroblock of the first frame to each of search blocks included in the at least one search area of the second frame; and calculating a motion vector to correct an output image of the second frame based on a resultant value of the statistical operation.

Implementations can optionally include one or more of the following features. The pixel data of the at least one reference macroblock of the first frame are loaded. Also, at least one reference macroblock of the second frame positioned at the same coordinates as the at least one reference macroblock of the first frame. The method includes calculating information including the loaded pixel data of the at least one reference macroblock of the first frame and the loaded at least one reference macroblock of the second frame. Also, the method includes controlling the statistical operation based on the calculated information. Calculating the pixel data can include calculating each difference value between pixel values of the reference macroblocks of the first and second frames; comparing the calculated difference values to a first reference value; and calculating position information of pixels whose calculated difference value is the same as or larger than the first reference value. Controlling the statistical operation can include controlling the statistical operation only on the pixels corresponding to the position information among the pixels of the reference macroblock of the first frame. The method includes calculating a rate of the pixels whose calculated difference value is the same as or larger than the first reference value in the reference macroblock; and comparing the calculated rate to a second reference value. Controlling the statistical operation can include controlling the statistical operation by using at least one of resultant information obtained by comparing the calculated rate to the second reference value and the calculated position information.

The subject matter described in this specification can optionally provide one or more of the following advantages. For example, the described techniques, apparatus and systems for correcting moving image wavering does not need additional device to perform the corresponding function, and thus does not result in an increase in the production costs and unit cost of products as well as a size of the products. Also, the described techniques, apparatus and systems for correcting moving image wavering can avoid errors in motion estimation and does not increase the calculation time to maintain fast performance.

DETAILED DESCRIPTION

Figure 1:
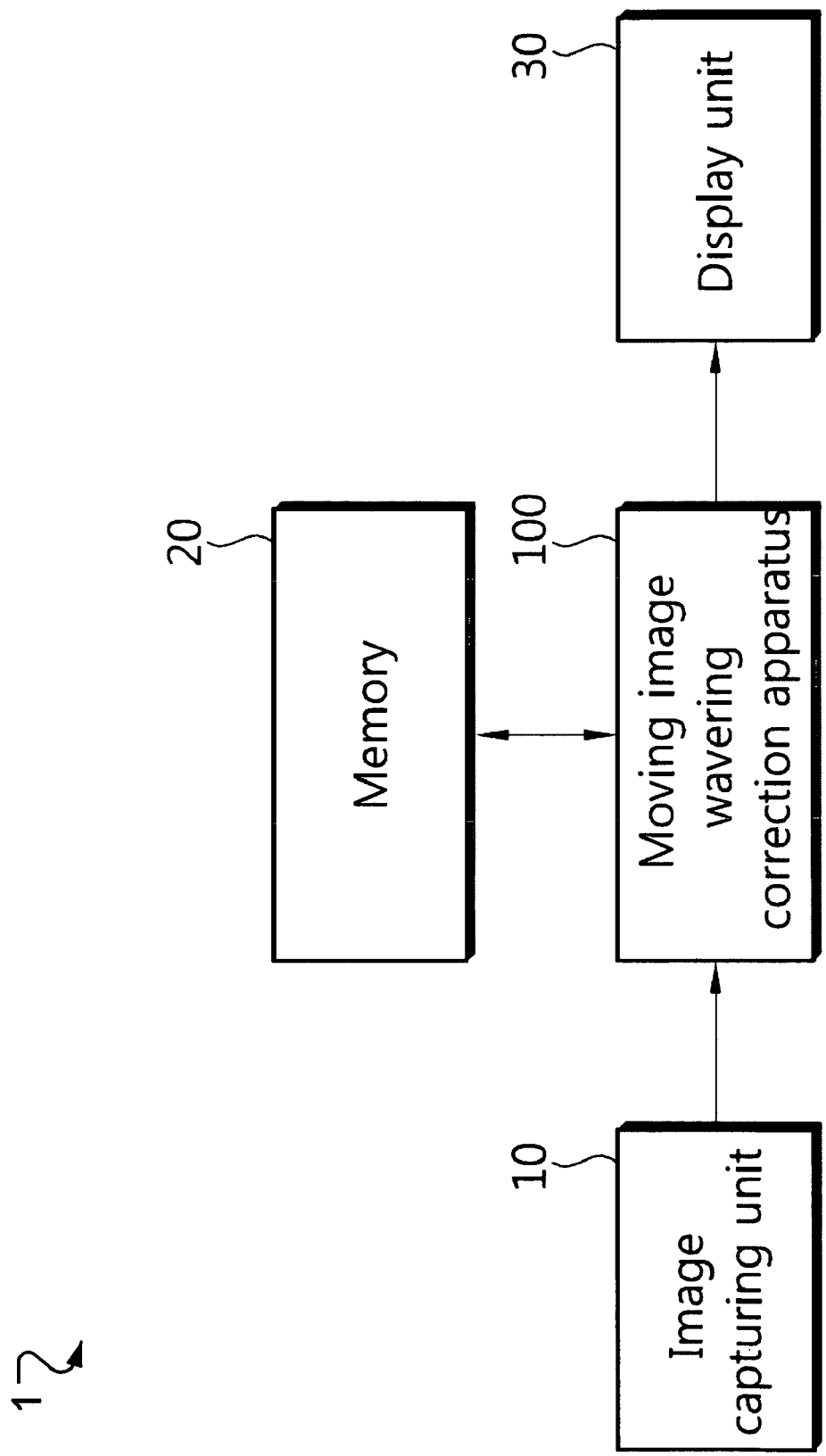
FIG. 1 is a schematic block diagram illustrating a configuration of a digital image capturing device including an apparatus for correcting moving image wavering according to a first embodiment of the present specification.

FIG. 1 is a schematic block diagram illustrating a configuration of a digital image capturing device including an apparatus for correcting moving image wavering according to a first embodiment of the present specification. As shown in FIG. 1, the moving image wavering correction apparatus 100 according to an embodiment of the present specification may be provided in a digital image capturing device 1. The digital image capturing device 1 may include, for example, a digital camcorder, a digital camera having an image capturing function, a mobile terminal, and the like.

The moving image wavering correction apparatus 100 may interwork with an image capturing unit 10, a memory 20, and a display unit 30 of the digital image capturing device 1. The image capturing unit 10, which captures an image and converts it into an electrical signal, may include a CMOS module, an optical image capturing sensor, and the like. The memory 20 may include various storage means for storing digital data. The display unit 30, which displays an image on its screen, may include, for example, an liquid crystal display (LCD) panel.

The moving image wavering correction apparatus 100 may successively receive an image in units of frames, namely, a frame image, from the image capturing unit 10, correct the received frame image by using an improved, effective process to remove distortion generated due to wavering or the like, and then transmit the corrected frame image to the display unit 30.

Figure 2:
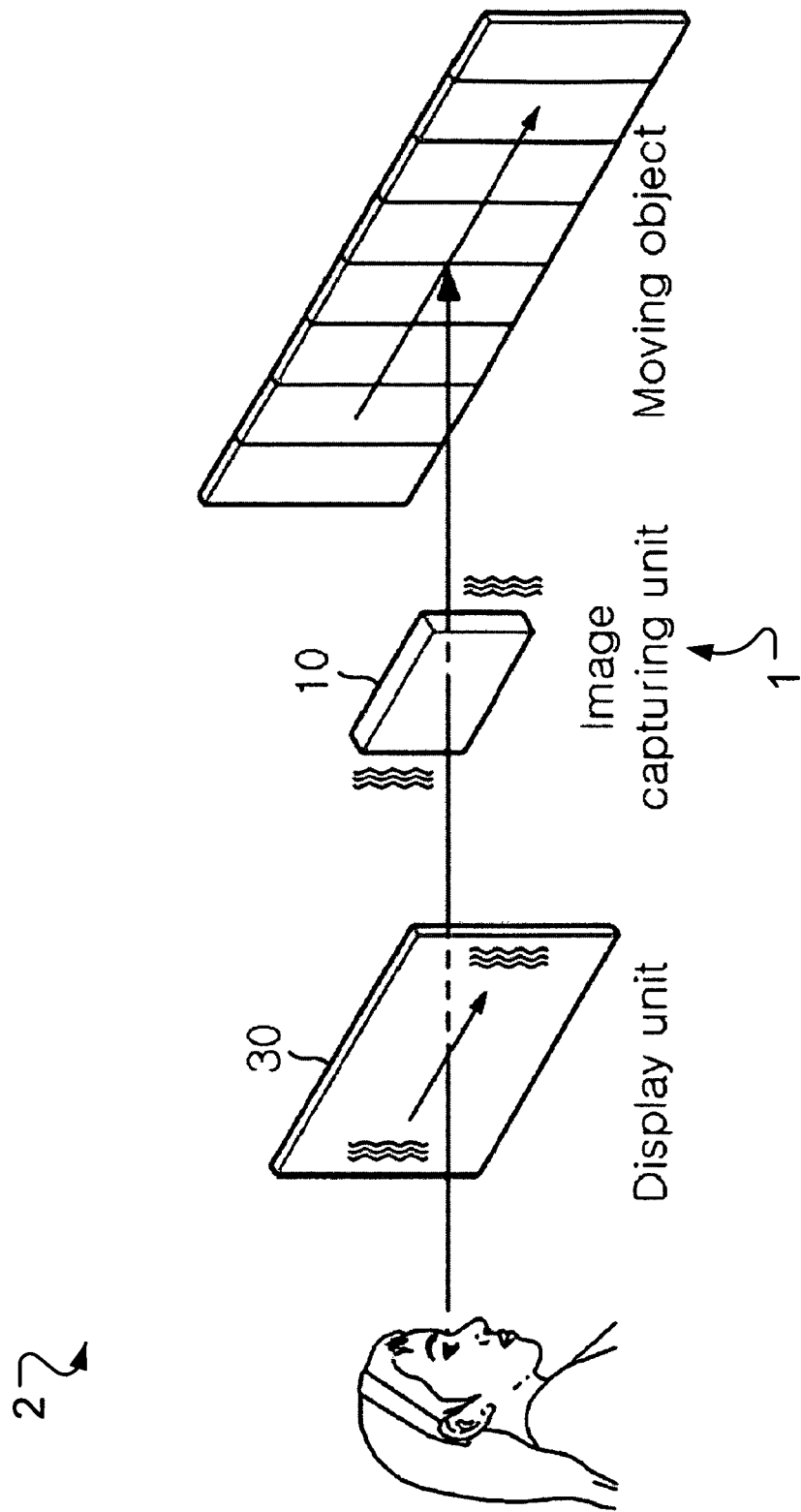
FIG. 2 illustrates a concept of distortion due to the above-mentioned wavering.
Figure 3:
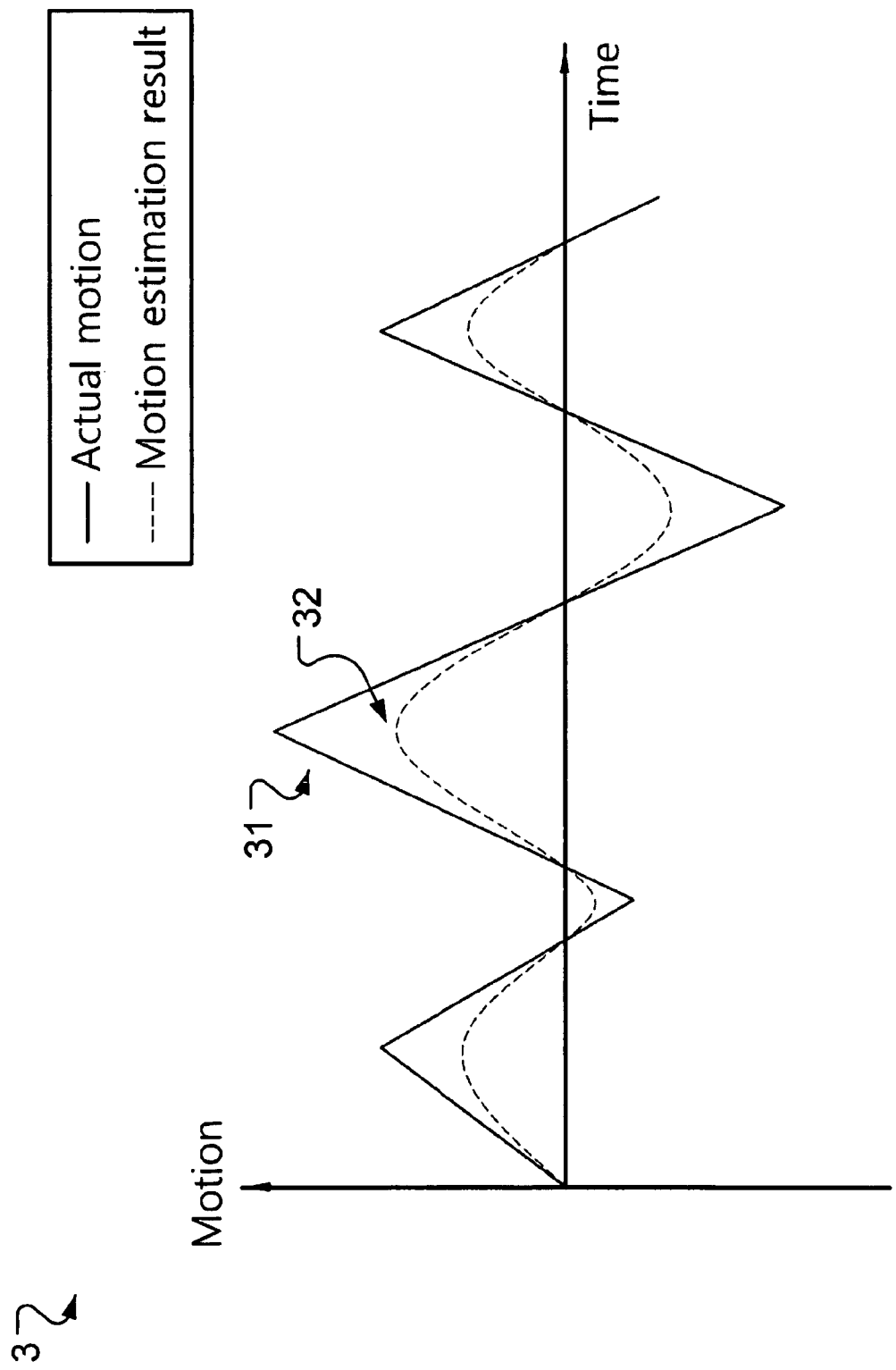
FIG. 3 is a graph showing motion estimation for correcting distortion due to wavering.

FIG. 2 is a diagram 2 that illustrates a concept of distortion due to the above-mentioned wavering, and FIG. 3 is a graph 3 showing a motion estimation for correcting distortion due to wavering. As shown in FIG. 2, an actual movement of a moving object is captured by the digital image capturing device 1 including the image capturing unit 10 and then displayed for the user via the display unit 30. At this time, the image displayed via the display unit 30 reflects a motion, such as a shake of the image capturing unit 10 caused by wavering and the like of the person (i.e., user) who captures the image as well as the actual movement of the moving object.

Thus, as shown in FIG. 3, the digital image capturing device 1 uses the moving image wavering correction apparatus 100 to provide correction using motion estimation and the like to the image including the moving object in actual motion to display a quality image. The graph 3 in FIG. 3 shows the actual motion 31 and the result of motion estimation 32.

Figure 4:
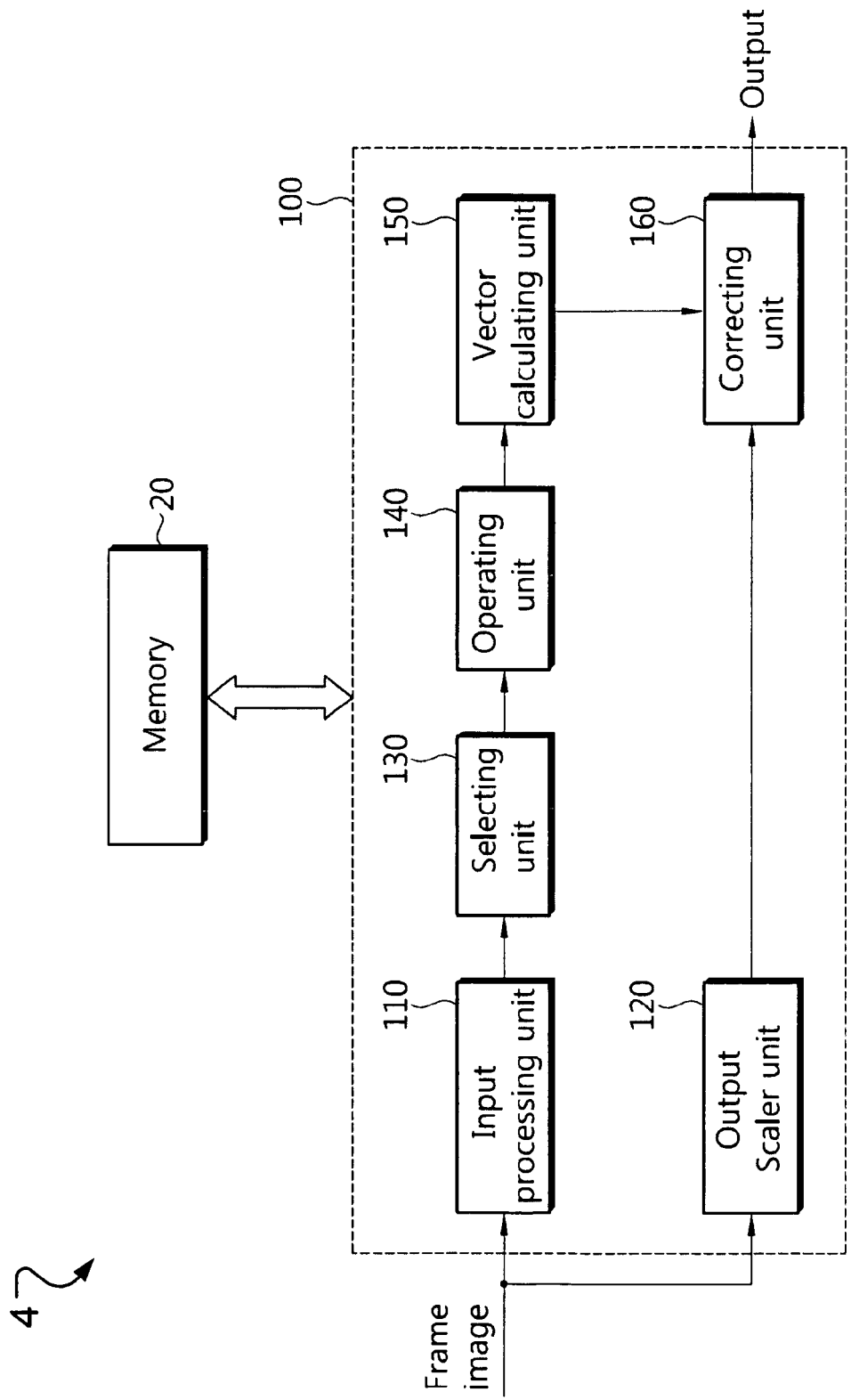
FIG. 4 is a schematic block diagram illustrating a detailed configuration of the apparatus for correcting moving image wavering of FIG. 1.

FIG. 4 is a schematic block diagram 4 illustrating a detailed configuration of the moving image wavering correction apparatus 100, showing the configuration of the moving image wavering correction apparatus 100 according to an embodiment of the present specification.

As shown in FIG. 4, the moving image wavering correction apparatus 100 includes an input processing unit 100, an output scaler unit 120, a selecting unit 130, an operating unit 140, a vector calculating unit 150, a correcting unit 160, and the like. These elements of the moving image wavering correction apparatus 100 may perform their unique function and may interwork with the memory 20 for a pertinent operation.

The input processing unit 110 may serve to generate frame images sequentially received from the image capturing unit 10 to generate an input image of each frame, and transmit the generated input image of each frame to the selecting unit 130. For example, the input processing unit 110 may scale down the image by lowering resolution of the received frame image and convert each pixel value of the reduced image into a gray level value to generate an input image so as to be inputted to the selecting unit 130.

Figure 5:
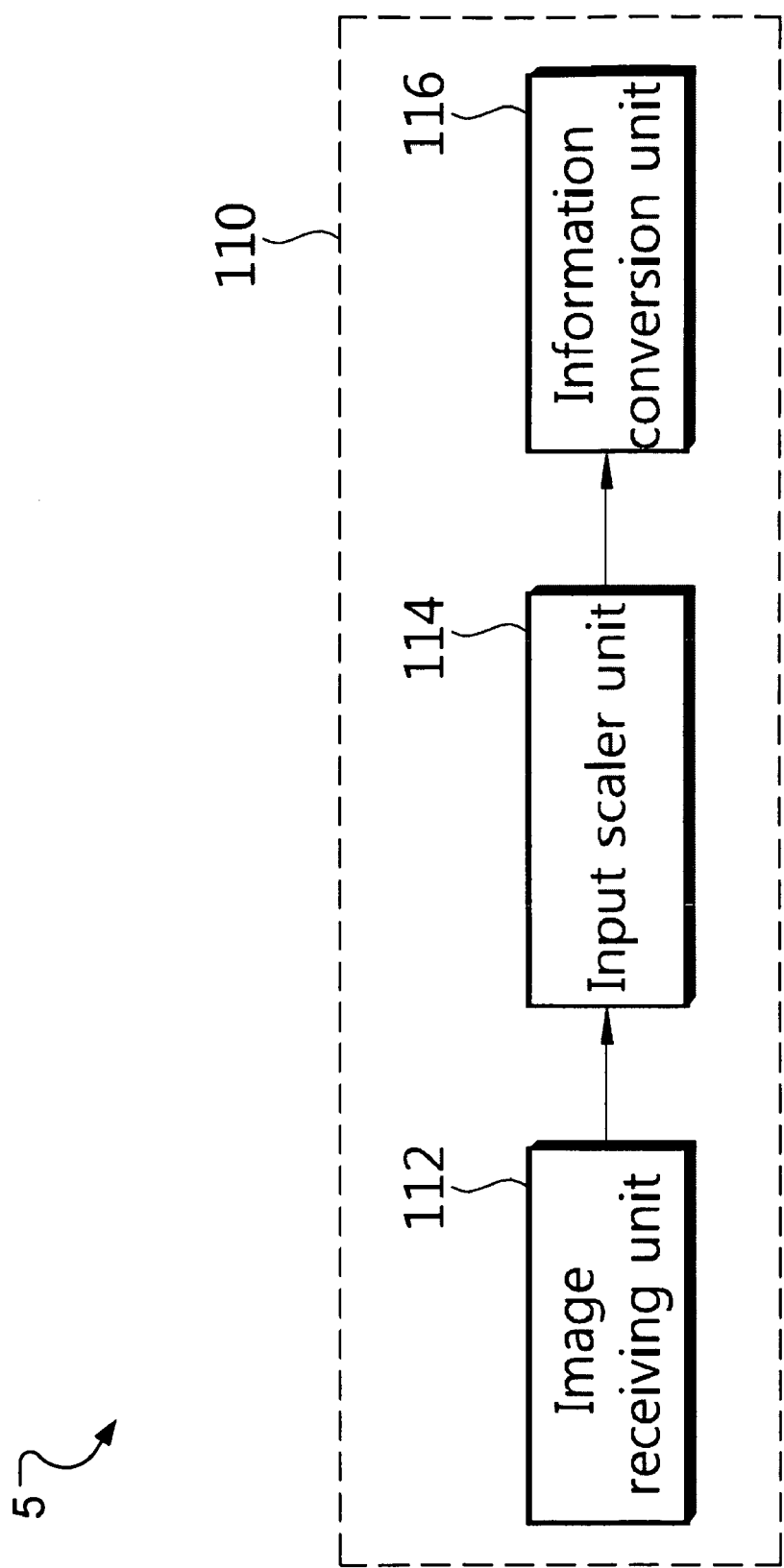
FIG. 5 is a schematic block diagram illustrating a configuration of an input processing unit of FIG. 4.

FIG. 5 is a schematic block diagram 5 illustrating a configuration of the input processing unit 110 of FIG. 4. As shown in FIG. 5, the input processing unit 110 may include an image receiving unit 112, an input scaler unit 114, and an information conversion unit 116.

The image receiving unit 112 may receive a frame image from the image capturing unit 10. For example, the image receiving unit 112 may start to receive a first frame image of moving images (i.e., video) captured by the image capturing unit 10, sequentially receive the (N−1)th frame image ('N' is an integer and the (N−1)th frame image will be referred to as a 'previous frame', hereinafter, for the sake of brevity) and the Nth frame (referred to as a 'present frame', hereinafter). The received frame images may be high resolution images including 1024×768 pixels. A pixel value of each pixel may include YCbCr data.

The input scaler unit 114 may downsize the frame images received by the image receiving unit 112. For example, the input scaler unit 114 may lower the resolution of the previous frame image and the current frame image to downsize them to have images of 512×384 pixels.

The rate for reducing the size of the frame images may vary according to embodiments. For example, the size of the received frame images may be reduced by 50% to 70% to increase calculation efficiency while preventing degradation of the effect of calculation of motion vectors and a correction through the motion vectors.

The information conversion unit 116 may serve to convert the pixel values of the images downsized by the input scaler unit 114 into gray level values. Each pixel of the frame images received by the image receiving unit 112 has information such as brightness, saturation, hue, and the like, and in case of calculating a motion vector, the motion vector can be calculated only with the brightness information. Thus, the information conversion unit 112 converts the values of the respective pixels into gray level values.

If the frame image of high resolution captured by the image capturing unit 10 is calculated, the number of pixels to be calculated is too many and the amount of information of each pixel is too much, increasing the use of the memory 20 and lowering the calculation efficiency. However, calculation by using the input image processed by the input processing unit 110 can reduce the number of pixels and the amount of information of each pixel, leading to a reduction in the use of the memory 20 and an improvement of the calculation efficiency. When comparing an output image corrected by using a motion vector calculated by using an original image and an output image corrected by using a motion vector calculated by using the processed input image, the results showed that the difference between the two was too minute to be recognized by a human being.

Referring back to FIG. 4, the output scaler unit 120 may serve to downsize the frame images sequentially received from the image capturing unit 10 such that they correspond to a prescribed size of an output image. For example, the output scaler unit 120 may downsize the previous frame image or current frame image received from the image capturing unit 10 to a size requested by the display unit 30.

The size of the output image may be smaller than that of the input image. For example, if the input image downsized by the input scaler unit 114 is an image of 512×384, the output image downsized by the output scaler unit 120 may have, for example, a size of 320×240.

The output scaler unit 120 may provide a user interface for setting the size of the output image and resize the output image according to a size set by the user.

The selecting unit 130 may serve to select at least one reference macroblock from an input image of each frame received from the input processing unit 110 and search areas corresponding to the respective reference macroblocks. The reference macroblock of each frame may be a particular macroblock in a search area of a corresponding frame.

In image correction, a shake of an image caused by wavering should be discriminated from the motion of the subject whose image is being captured. Thus, in order to generate a precisely and accurately corrected image, only distortion caused by wavering, except for the movement of the subject, should be corrected. In general, in capturing moving images (i.e., video), the subject is focused on a central portion of an image. Thus, for a precise correction, a motion vector is calculated based on a background part where the possibility that the subject exists is low. Thus, the selecting unit 130 may select separated regions spaced apart by a certain distance from the center of the input image of each frame, as the search areas for calculating a motion vector.

The positions of the search areas and the reference macroblocks may be set by the user. For example, the selecting unit 130 may provide a user interface allowing setting of coordinates of search areas or reference macroblocks, and select the search areas and the reference macroblocks according to the set coordinates. Meanwhile, the positions of the search areas and the reference macroblocks may be previously determined according to hardware resource, operation processing capacity, or the like, of the digital image capturing device 1 including the moving image wavering correction apparatus 100.

Figure 6:
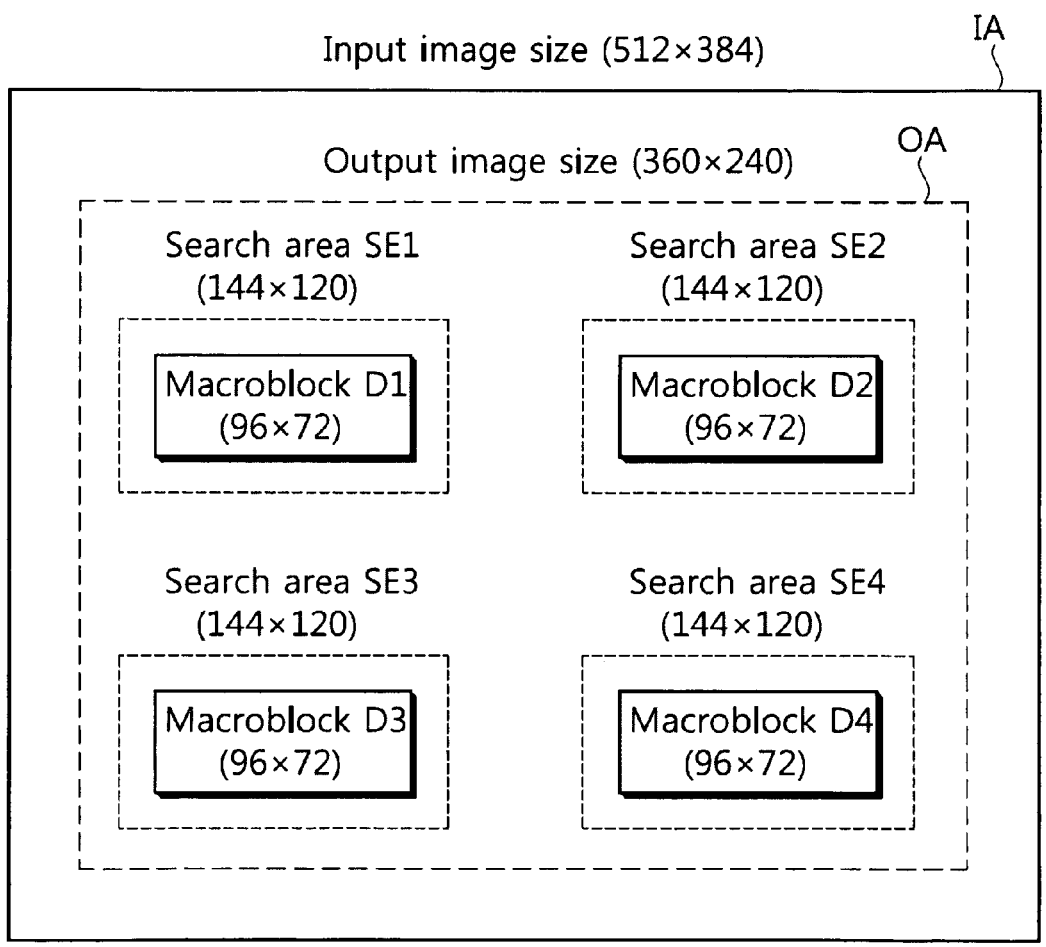
FIG. 6 illustrates search areas selected by a selecting unit and reference macroblocks.

FIG. 6 is a diagram 6 that illustrates search areas selected by a selecting unit and reference macroblocks. As shown in FIG. 6, the selecting unit 130 may select four separated search areas, e.g., SE1, SE2, SE3, and SE4, spaced apart by a certain distance from the center of an input image (IA) of each frame. Each search area may have, for example, a size of 144×120.

The selecting unit 130 may select the search areas such that they are included within the size of an output image (OA) of each frame. For example, if the input image IA has a size of 512×384 and the output image OA has a size of 360×240, preferably, the selecting unit 130 selects the search areas, e.g., SE1, SE2, SE3, and SE4, are included within the size of 360×240.

The selecting unit 130 may select macroblocks of particular coordinates, e.g., D1, D2, D3, and D4, as reference macroblocks in each of the search areas. In the case as illustrated in FIG. 6, the reference macroblocks are set to have a size of 96×72, respectively.

In this manner, when an input image of a previous frame is received, the selecting unit 130 may select search areas and reference macroblocks from the input image of the previous frame and store them in the memory 20, and when an input image of a current frame is received, the selecting unit 130 may select search areas and reference macroblocks from the input image of the current frame and store them in the memory 20. In this case, the memory 20 may include line memories. For example, the pixel data of the search areas the reference macroblocks, and the like, may be stored in each line memory.

In an embodiment of the present specification, in order to calculate a motion vector of the current frame, the reference macroblocks of the previous frame and the search areas of the current frame are used. This will be described based on the configuration of the operating unit 140 and the vector calculating unit 150 as follows.

In order to calculate information to be used for calculating a motion vector to correct the current frame, the operating unit 140 performs statistical operation by using the reference macroblocks selected from the input image of the previous frame (i.e., the reference macroblocks of the previous frame) and the search areas selected from the input image of the current frame (i.e., the search areas of the current frame), and calculates an operation matrix. For example, the operating unit 140 may perform the statistical operation while matching the reference macroblocks of the previous frame to each search blocks included in the search areas of the current frame.

The statistical operation may be diverse arithmetic operation schemes, e.g., sum of absolute difference (SAD), sum of squared difference (SSD), mean squared error (MSE), mean absolute distortion (MAD), and the like, for calculating the operation matrix. The statistical operation may be selected in consideration of the specification of the digital image capturing device 1 including the moving image waving correction apparatus 100, and the SAD operation scheme including operations limited to the addition and subtraction operations allowing a fast operation processing may be used.

Figure 7:
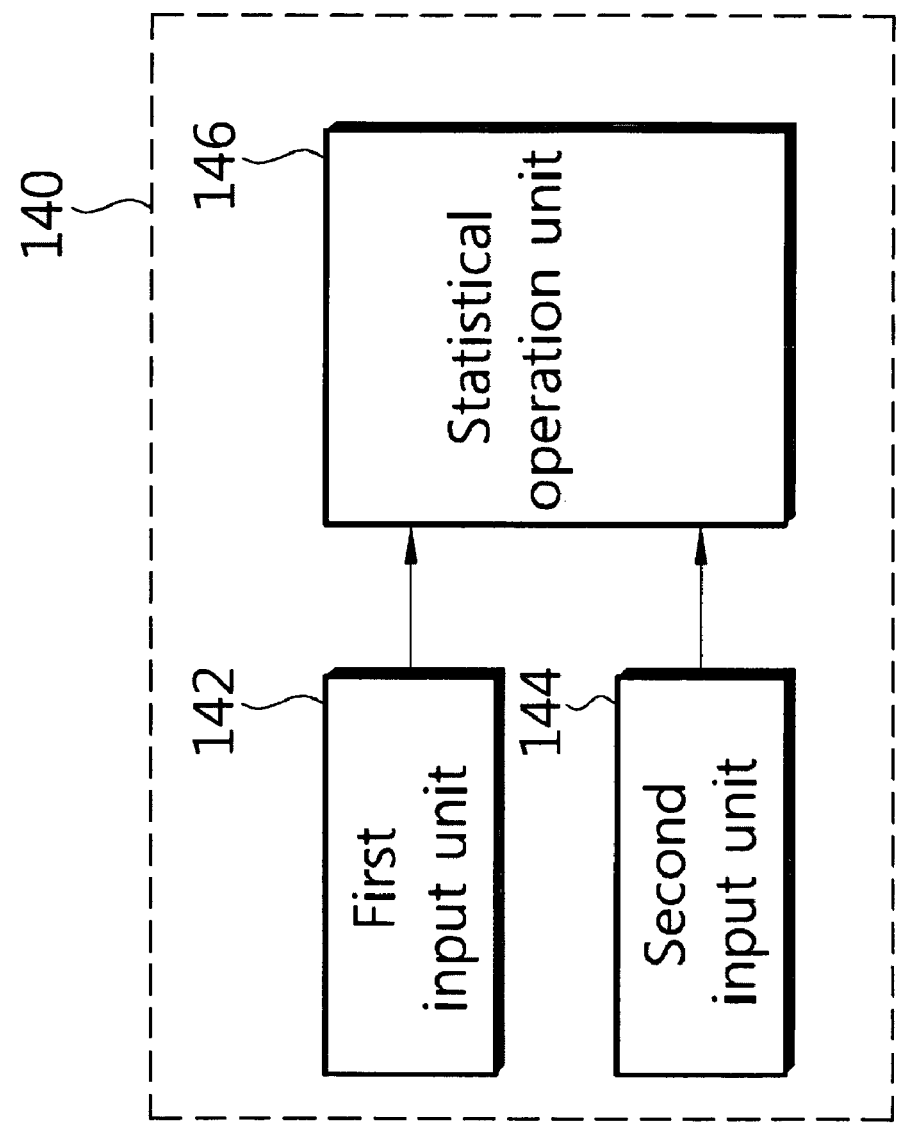
FIG. 7 is a schematic block diagram illustrating a configuration of an operating unit of FIG. 4.

FIG. 7 is a schematic block diagram 7 illustrating a configuration of the operating unit 140 of FIG. 4. As shown in FIG. 7, the operating unit 140 includes a first input unit 142, a second input unit 144, and a statistical operation unit 146.

In a procedure for correcting the current frame, the first input unit 142 loads the pixel data of the reference macroblocks of the previous frame stored in the memory 20 from the memory 20. The second input unit 144 loads the pixel data of the search areas of the current frame stored in the memory 20 from the memory 20.

The statistical operation unit 146 may perform statistical operation (e.g., SAD operation, etc.) while shifting the reference macroblocks of the previous frame in a vertical direction or horizontal direction such that they correspond to each of the search blocks included in the search areas of the current frame, to calculate an operation matrix (e.g., an SAD operation matrix, etc.)

Hereinafter, the operation of the operating unit 140 will be described in more detail. First, for the sake of brevity, it is assumed that the reference macroblocks have a size of 9×9, but without being limited thereto, the macroblocks may be variably selected according to an embodiment such as a size of 96×72 and the like, and also, the search areas may be variably selected according to an embodiment such as a size of 144×120 and the like.

In addition, although multiple reference macroblocks and search areas are selected, the statistical operation is the same for each. Thus, a statistical operation using a single reference macroblock and a search area will be taken as an example.

TABLE 1

| m11 | m12 | m13 | m14 | m15 |
|---|---|---|---|---|
| m21 | m22 | m23 | m24 | m25 |
| m31 | m32 | m33 | m34 | m35 |
| m41 | m42 | m43 | m44 | m45 |
| m51 | m52 | m53 | m54 | m55 |

Table 1 shows a reference macroblock of the previous frame, having the size of 5×5, in which m11, m12, . . . , m55 represent pixels in the reference macroblocks.

TABLE 2

| s11 | s12 | s13 | s14 | s15 | s16 | s17 | s18 | s19 |
|---|---|---|---|---|---|---|---|---|
| s21 | s22 | s23 | s24 | s25 | s26 | s27 | s28 | s29 |
| s31 | s32 | s33 | s34 | s35 | s36 | s37 | s38 | s39 |
| s41 | s42 | s43 | s44 | s45 | s46 | s47 | s48 | s49 |
| s51 | s52 | s53 | s54 | s55 | s56 | s57 | s58 | s59 |
| s61 | s62 | s63 | s64 | s65 | s66 | s67 | s68 | s69 |
| s71 | s72 | s73 | s74 | s75 | s76 | s77 | s78 | s79 |
| s81 | s82 | s83 | s84 | s85 | s86 | s87 | s88 | s89 |
| s91 | s92 | s93 | s94 | s95 | s96 | s97 | s98 | s99 |

Table 2 shows a search area of the current frame, having a size of 9×9, in which s11, s12, . . . , s99 represent pixels in the search area.

TABLE 3

| s11 | s12 | s13 | s14 | s15 | s16 | s17 | s18 | s19 |
|---|---|---|---|---|---|---|---|---|
| s21 | s22 | s23 | s24 | s25 | s26 | s27 | s28 | s29 |
| s31 | s32 | s33 | s34 | s35 | s36 | s37 | s38 | s39 |
| s41 | s42 | s43 | s44 | s45 | s46 | s47 | s48 | s49 |
| s51 | s52 | s53 | s54 | s55 | s56 | s57 | s58 | s59 |
| s61 | s62 | s63 | s64 | s65 | s66 | s67 | s68 | s69 |
| s71 | s72 | s73 | s74 | s75 | s76 | s77 | s78 | s79 |
| s81 | s82 | s83 | s84 | s85 | s86 | s87 | s88 | s89 |
| s91 | s92 | s93 | s94 | s95 | s96 | s97 | s98 | s99 |

| s11 | s12 | s13 | s14 | s15 | s16 | s17 | s18 | s19 |
|---|---|---|---|---|---|---|---|---|
| s21 | s22 | s23 | s24 | s25 | s26 | s27 | s28 | s29 |
| s31 | s32 | s33 | s34 | s35 | s36 | s37 | s38 | s39 |
| s41 | s42 | s43 | s44 | s45 | s46 | s47 | s48 | s49 |
| s51 | s52 | s53 | s54 | s55 | s56 | s57 | s58 | s59 |
| s61 | s62 | s63 | s64 | s65 | s66 | s67 | s68 | s69 |
| s71 | s72 | s73 | s74 | s75 | s76 | s77 | s78 | s79 |
| s81 | s82 | s83 | s84 | s85 | s86 | s87 | s88 | s89 |
| s91 | s92 | s93 | s94 | s95 | s96 | s97 | s98 | s99 |

Table 3 shows the process of performing a statistical operation by using the reference macroblock of the previous frame as shown in FIG. 1 and the search area of the current frame as shown in FIG. 2.

As shown in Table 3, the operating unit 140 may perform statistical operation while matching the reference macroblock to each of the search blocks in the search area by shifting the reference macroblock of the previous frame one line by one line horizontally or vertically in the search area. In this case, the search block may refer to each block matched to the reference macroblock when the reference macroblock is shifted in the search area. Accordingly, the search block has the same size as the reference macro block.

The range within which the reference macroblock can be shifted in the search area is 5 lines in the horizontal direction and 5 lines in the vertical direction. Thus, when the statistical operation unit completes the operation, an operation matrix having the operation result values, namely, having points of 5×5, as shown in Table 4 below. In this case, each point of the operation matrix may refer to the result value obtained by performing the statistical operation, e.g., the SAD operation, by using the pixel data of the reference macroblock and the pixel data of the corresponding search block.

TABLE 4

| SAD11 | SAD12 | SAD13 | SAD14 | SAD15 |
|---|---|---|---|---|
| SAD21 | SAD22 | SAD23 | SAD24 | SAD25 |
| SAD31 | SAD32 | SAD33 | SAD34 | SAD35 |
| SAD41 | SAD42 | SAD43 | SAD44 | SAD45 |
| SAD51 | SAD52 | SAD53 | SAD54 | SAD55 |

If it is assumed that a search area of the current frame has a size of 144×120 and a reference macroblock of the previous frame has a size of 96×72 based on the same concept, then, the reference macroblock may be shifted by 49 lines horizontally and by 49 lines vertically within the search area. Accordingly, a result value of the statistical operation performed by the operating unit 140 may be an operation matrix having a size of 49×49.

When the operation matrix is obtained through such process, the operating unit 140 may store the operation matrix in the memory 20. For example, the operation matrix may be stored in the line memory.

The vector calculating unit 150 may calculate a motion vector for correcting an output image of the current image by using the result value, namely, the operation matrix, of the statistical operation performed by the operating unit 140. The motion vector may refer to relative vector values of the best matched block, i.e., which is most similar to the reference macroblock among the search blocks included in the search area, and the reference macroblock.

The vector calculating unit 150 may load the operation matrix stored in the memory 20 by the operating unit 140 from the memory 20, and detect a point having a minimum value from the loaded operation matrix. The vector calculating unit 150 may regard a search block corresponding to the detected point as a matching block, calculate position information of the matching block, and calculate a motion vector based on the calculated position information.

In order to detect the point having a minimum value from the operation matrix, the vector calculating unit 150 may use a spiral search method in which the value of the point is searched in a spiral direction starting from a central point of the operation matrix.

Figure 8:
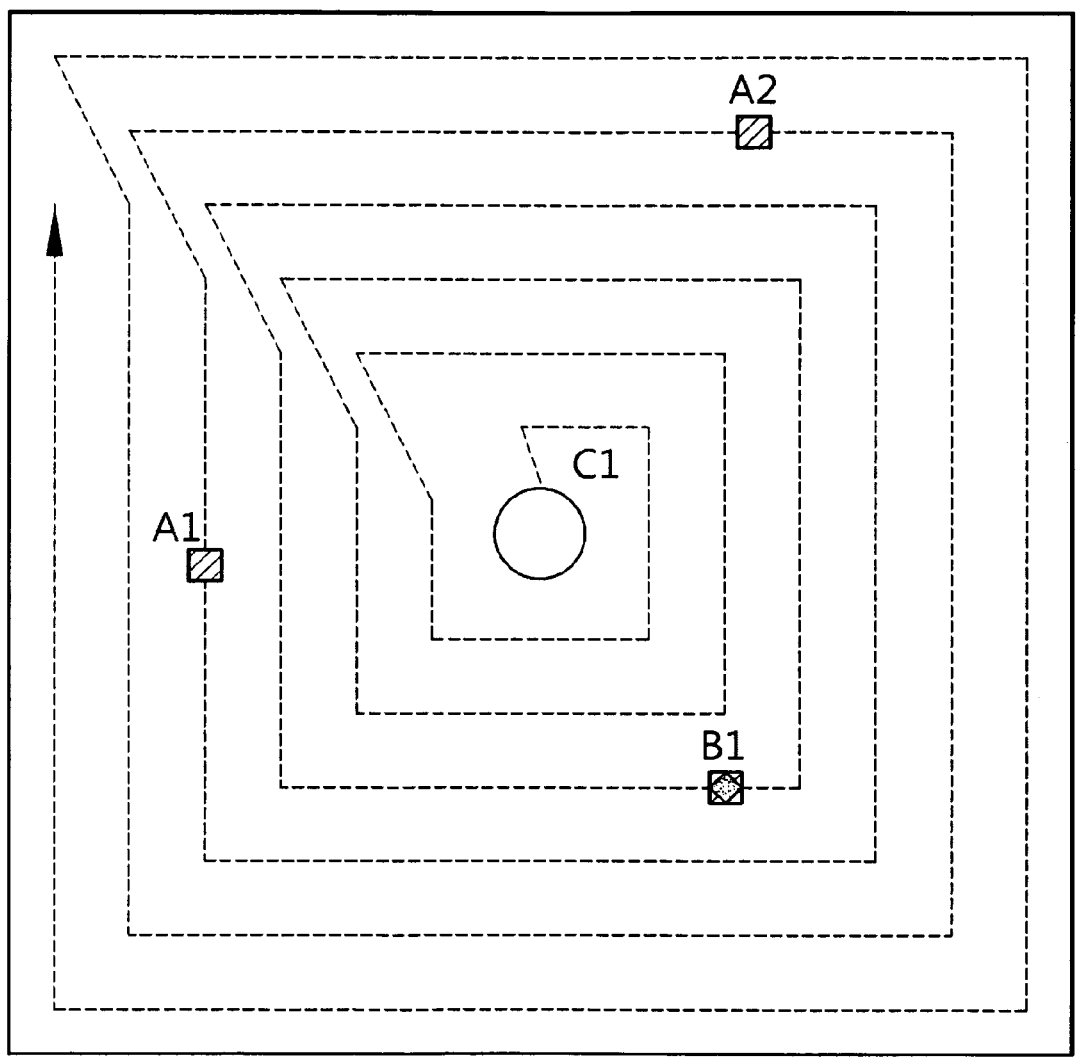
FIG. 8 illustrates a process of spiral searching performed by a vector calculating unit.

FIG. 8 is a diagram 8 that illustrates the process of the spiral searching performed by the vector calculating unit 150. As shown in FIG. 8, in order to search the point having a minimum value from the operation matrix, the vector calculating unit 150 may perform searching along a path expanding its rotational radius, while rotating clockwise (or counterclockwise) after starting from the central point C1 of the operation matrix.

If multiple points have a minimum value, the vector calculating unit 150 may detect a point closest to the central point C1 and calculate position information of a matching block. For example, in FIG. 8, B1 is a point having a minimum value, and A1 and A2 are points having the same value as that of B1. Namely, B1, A1, and A2 have the same minimum value. In this case, the vector calculating unit 150 may detect B1 which is closest to the central point C1.

The correcting unit 160 may serve to correct an output image of the current frame which has been downsized by the output scaler unit 120 by using the motion vector calculated by the vector calculating unit 150.

For example, the correcting unit 160 determines whether or not the characteristics of the motion vector corresponds to a movement intended by the user by using a motion vector integration (MVI), and if the characteristics of the motion vector corresponds to an unintentional movement, namely, wavering or the like, the correcting unit 160 may perform correction by reflecting the motion vector on the output image by adjusting an offset or the like of the output image.

The configuration of the moving image wavering correction apparatus 100 according to the first embodiment of the present specification has been described. Hereinafter, a procedure for performing correction by using the moving image wavering correction apparatus 100 will be described methodologically.

Figure 9:
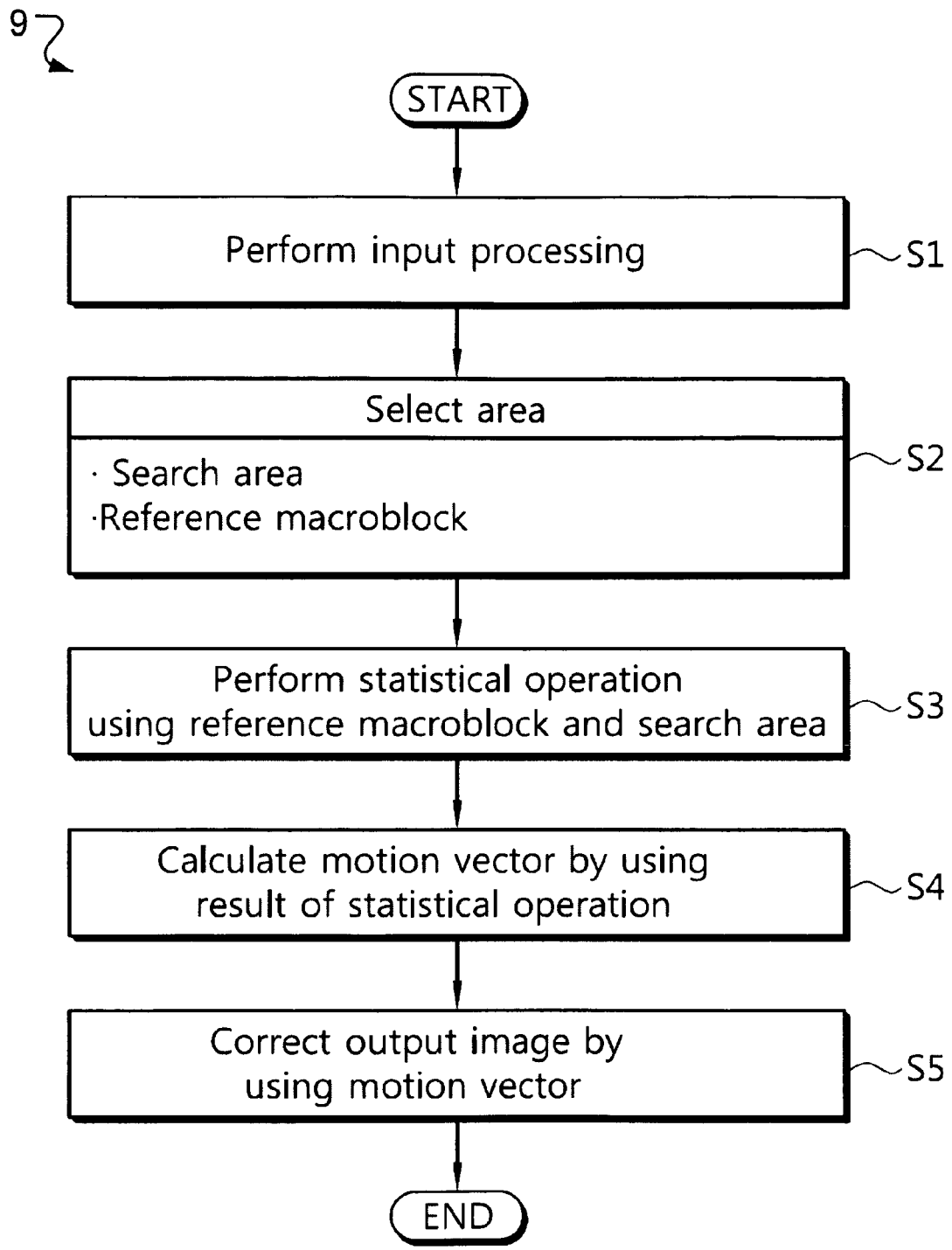
FIG. 9 is a flow chart illustrating a method for correcting moving image wavering according to the first embodiment of the present specification.

FIG. 9 is a flow chart 9 illustrating a method for correcting moving image wavering according to the first embodiment of the present specification, which mainly shows steps related to the procedure for correcting an image of a current frame. As mentioned above, in order to correct the image of the current frame, information of the previous frame and that of the current frame are used.

As shown in FIG. 9, the moving image wavering correction apparatus 100 may generate an input image of each frame by processing frame images sequentially received from the image capturing unit (S1). For example, when an image of a previous frame is received from the image capturing unit 10, the moving image wavering correction apparatus 100 may downsize the received image of the previous frame and convert the pixel values into gray level information. Subsequently, when the image of the current frame is received from the image capturing unit 10, the moving image wavering correction apparatus 100 may downsize the image of the current frame and convert pixel values into gray level information. Namely, the moving image wavering correction apparatus 100 may convert a color image of high resolution into downsized black and white image (i.e., an input image of each frame) in the input processing step (S1).

And then, the moving image wavering correction apparatus 100 selects search areas and reference macroblocks from the processed input image of each frame (S2). For example, the moving image wavering correction apparatus 100 selects search areas and reference macroblocks from the input image of the previous frame and store pixel data of the selected search areas and the reference macroblocks of the previous frame in the memory 20. And then, the moving image wavering correction apparatus 100 may select the search areas and the reference macroblocks from the input image of the current frame and store pixel data of the selected search areas and the reference macroblocks of the current frame in the memory 20. Among the stored information, the pixel data of the reference macroblocks of the previous frame, the pixel data of the search areas of the current frame, and the like, are used as information for calculating a motion vector of the current frame.

Thereafter, the moving image wavering correction apparatus 100 may perform statistical operation by matching the reference macroblocks of the previous frame to each search block included in the search areas of the current frame (S3). For example, the moving image wavering correction apparatus 100 may load pixel data of the reference macroblocks of the previous frame from the memory 20, and load the pixel data of the search blocks of the current frame from the memory 20. When the data is loaded, the moving image wavering correction apparatus 100 may perform statistical operation by matching the reference macroblocks of the previous frame to each of the search blocks included in the search areas of the current frame to calculate an operation matrix. The calculated operation matrix may be stored in the memory.

The moving image wavering correction apparatus 100 may calculate a motion vector by using the result value of the statistical operation (S4). For example, the moving image wavering correction apparatus 100 may load the operation matrix stored in the memory 20 and detect a point having a minimum value from the loaded operation matrix. And the moving image wavering correction apparatus 100 may regard the search block corresponding to the detected point as a matching block, calculates position information of the matching block, and then calculate a motion vector by using the calculated position information.

As mentioned above, the moving image wavering correction apparatus 100 may use a spiral search method to detect the point having a minimum value from the operation matrix. In addition, if multiple points have the minimum value according to the search result, a point closest to the central point among the plurality of points may be detected.

When the motion vector is calculated, the moving image wavering correction apparatus 100 corrects an output image by using the calculated motion vector (S5). For example, the moving image wavering correction apparatus 100 determines whether or not the characteristics of the calculated motion vector correspond to a user's intentional movement. If the characteristics of the motion vector correspond to an unintentional movement, namely, wavering or the like, the moving image wavering correction apparatus 100 may adjusts the offset and the like of the output image of the current frame to correct the output image of the current frame. At this time, the output image of the current frame may be an image previously resized by the moving image wavering correction apparatus 100.

The moving image wavering correction apparatus 100 and its method according to the first embodiment of the present specification have been described. In some embodiments the amount of calculation in the statistical operation can be further reduced.

Figure 10:
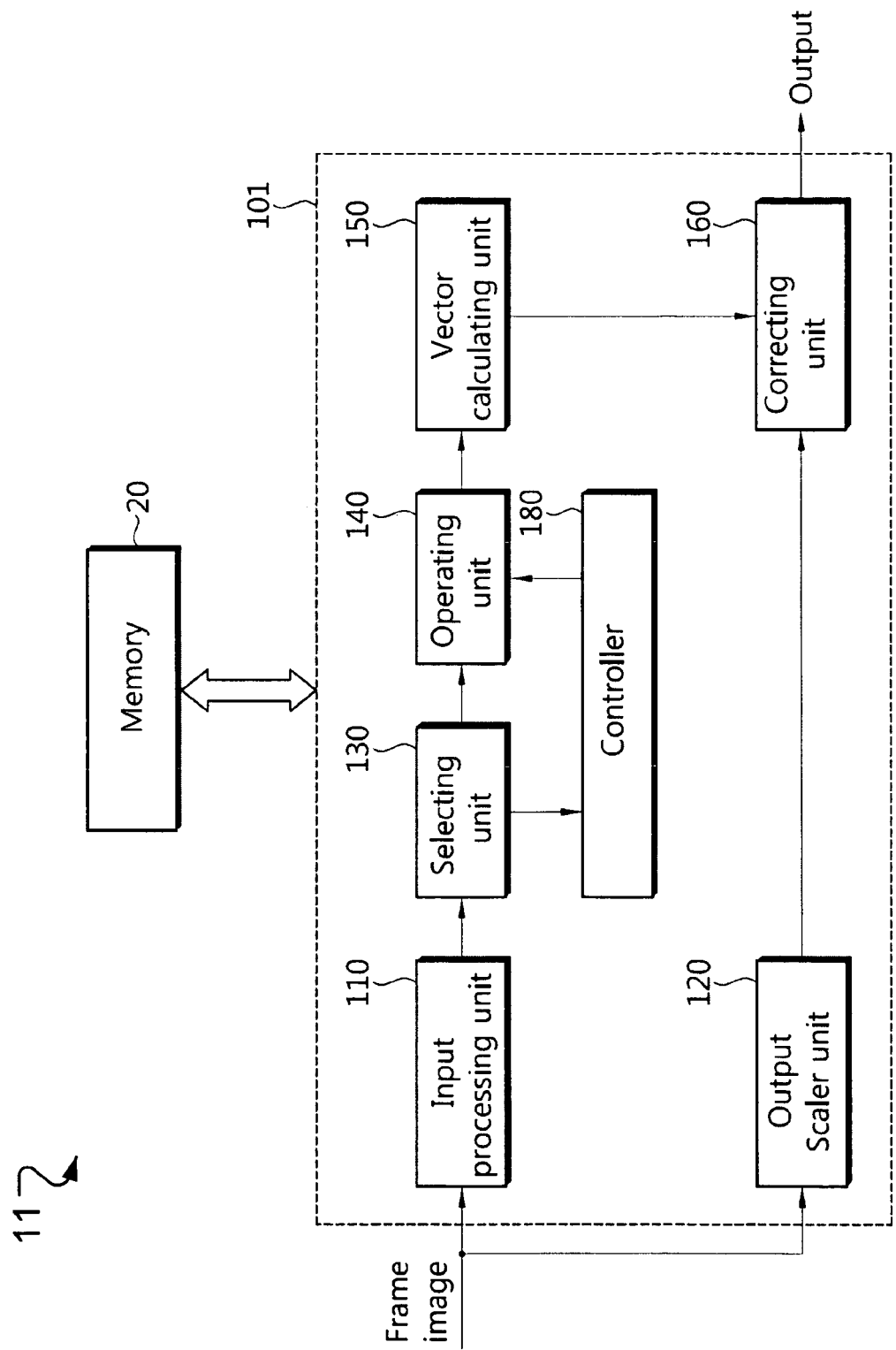
FIG. 10 is a schematic block diagram illustrating a configuration of an apparatus for correcting moving image wavering according to a second embodiment of the present specification.

FIG. 10 is a schematic block diagram 11 illustrating a configuration of an apparatus for correcting moving image wavering according to some embodiments of the present specification.

As shown in FIG. 10, a moving image wavering correction apparatus 101 according to the second embodiment of the present specification may include the input processing unit 110, the selecting unit 130, the operating unit 140, the vector calculating unit 150, the output scaler unit 120, the correcting unit 160, all those as described above, and a controller 180.

The controller 180 may calculate each difference value between pixel values of macroblocks at the same position respectively included in two frames, e.g., a previous frame and a current frame by pixel, and control a statistical operation performed by the operating unit based on the calculation result. For example, the controller may calculate each difference value between pixel values of a particular macroblock in a search area of the previous frame and the macroblock at the same position as the particular macroblock of the previous frame, detect pixel(s) whose difference value is a particular reference value or larger, and perform a function of controlling the operating unit 140 to perform a statistical operation only on the corresponding detected pixel(s).

Figure 11:
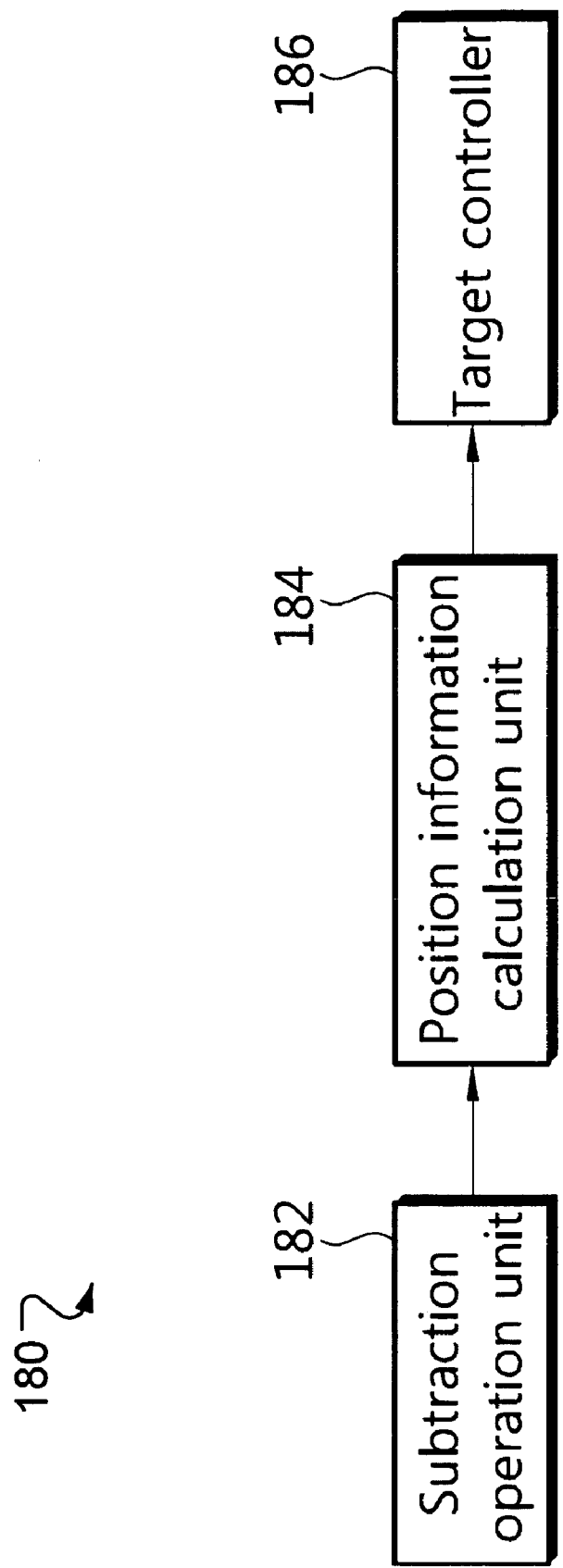
FIG. 11 is a schematic block diagram illustrating a configuration of a controller provided in the apparatus for correcting moving image wavering according to the second embodiment of the present specification.
Figure 12:
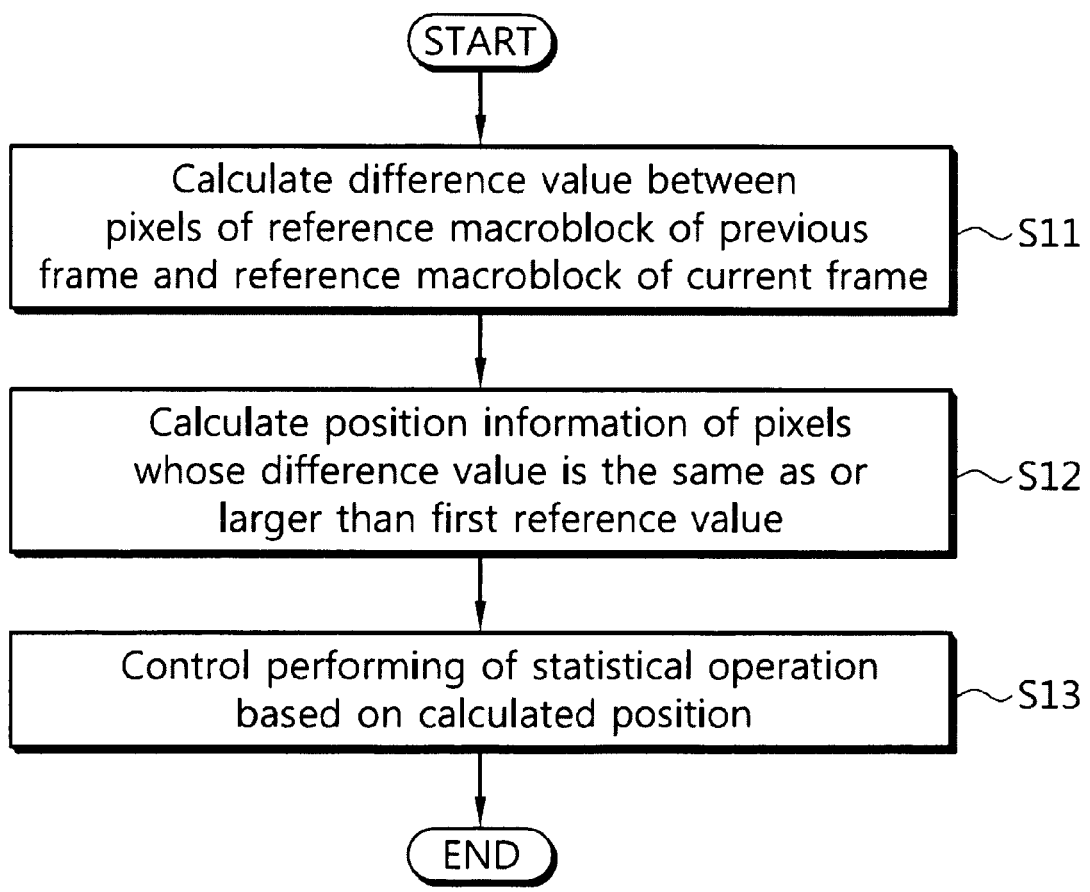
FIG. 12 is a flow chart illustrating an operation of the controller of FIG. 11.

FIG. 11 is a schematic block diagram illustrating the configuration of the controller, and FIG. 12 is a flow chart illustrating an operation of the controller of FIG. 11. As shown in FIG. 11, the controller 180 may include a subtraction operation unit 182, a position information calculation unit 184, and a target controller 186.

With reference to FIGS. 11 and 12, the subtraction operation unit 182 may load pixel data of the particular macroblock in the search area of the previous frame and pixel data of the macroblock at the same position as the particular macroblock in the current frame from the memory, and calculate each difference value between pixel values (S11). The particular macroblock may be a reference macroblock. For example, the subtraction operation unit 182 may load pixel data of a reference macroblock of the previous frame and that of a reference macroblock of the current frame from the memory, subtracts pixel values of the current frame corresponding to pertinent pixels from the respective pixel values of the reference macroblock of the previous frame, and calculate values obtained by taking absolute values.

It is assumed that input images of the previous frame and current frame are converted into black and white images by the input processing unit 110 and each pixel value is a gray level value. Thus, in this case, the difference values may represent the difference values of gray levels.

The position information calculation unit 184 compares the difference values between the pixel values calculated by the subtraction operation unit 182 to a pre-set reference value to calculate position information of pixel(s) whose difference value is the same as or larger than the pre-set reference value (S12).

The target controller 186 may control the operating unit 140 to selectively perform a statistical operation on pixels based on the calculated position information (S13). For example, the target controller 186 may store the calculated position information in the memory 20, and control the operating unit 140 to perform the statistical operation only on pixels corresponding to the stored position information among the pixels of the reference macroblock of the previous frame.

The example of the operation of the controller 180 having such configuration will now be described in detail with reference to Table 5 to Table 8.

TABLE 5

| 255 | 250 | 246 | 100 | 10 |
|---|---|---|---|---|
| 1 | 3 | 78 | 9 | 9 |
| 45 | 4 | 65 | 0 | 2 |
| 78 | 35 | 45 | 23 | 23 |
| 24 | 9 | 79 | 76 | 36 |

Table 5 shows an example of the reference macroblock of the previous frame. As shown in Table 5, it is assumed that the reference macroblock has a size of 5×5 and each pixel value represents a gray level value. In this case, the gray levels are illustrated to represent gray scales from 0 to 255, namely, 8-bit brightness information.

TABLE 6

| 255 | 252 | 242 | 100 | 8 |
|---|---|---|---|---|
| 2 | 7 | 66 | 9 | 11 |
| 43 | 6 | 52 | 0 | 2 |
| 70 | 24 | 32 | 34 | 23 |
| 21 | 5 | 73 | 65 | 30 |

Table 6 shows the reference macroblock of the current frame corresponding to the reference macroblock of the previous frame as shown in Table 5. The reference macroblock of the previous frame and that of the current frame are positioned at the same coordinates in the input images of the corresponding frames.

The controller 180 may load the information as shown in Table 5 and Table 6 from the memory 20, subtract each pixel value of the macroblock as shown in Table 6 from each pixel value of the macroblock as shown in Table 5, and obtain absolute values from the resultant values to calculate each difference value of the gray levels between the respective pixels. Then, a matrix as shown in below Table 7 is generated.

TABLE 7

| 0 | 2 | 4 | 0 | 2 |
|---|---|---|---|---|
| 1 | 4 | 12 | 0 | 2 |
| 2 | 2 | 13 | 0 | 0 |
| 8 | 11 | 13 | 11 | 0 |
| 3 | 4 | 6 | 11 | 6 |

As shown in Table 7, the controller 20 may calculate each difference value of gray levels between the pixels of the reference macroblock of the previous frame and that of the current frame.

The controller 20 compares the calculated difference values between the pixels to the pre-set reference value and detects position information of pixels whose difference value is the same as or larger than the reference value. Namely, if the difference value is larger than the reference value, the controller 20 considers that there is a change in the image at the corresponding pixel, and if the difference value is smaller than the reference value, the controller 20 considers that there is no change in the image at the corresponding pixel.

For example, if the reference value is determined as 10, the controller 20 may compare each difference value to the reference value 10 and may assign '1' to pixels whose difference value is the same as or larger than the reference value and '0' to pixels whose difference value is smaller than the reference value. Then the resultant values in a matrix form as shown in below Table 8 may be obtained.

TABLE 8

| 0 | 0 | 0 | 0 | 0 |
| 0 | 0 | 1 | 0 | 0 |
| 0 | 0 | 1 | 0 | 0 |
| 0 | 1 | 1 | 1 | 0 |
| 0 | 0 | 0 | 1 | 0 |

As shown in Table 8, the pixels corresponding to the coordinates (2,3), (3,3), (4,2), (4,3), (4,4), and (5, 4) in the reference macroblock correspond to pixels determined to have a change in the image.

The controller 180 may store the position information in the form as shown in Table 8 in the memory 20, e.g., in the line memory, and control the operating unit 140 to perform operations that may be limited to a statistical operation on the pixels corresponding to the position information.

For example, the operating unit 140 may perform a statistical operation by shifting the reference macroblock of the previous frame one line by one line horizontally or vertically within the search area to match the reference macroblock to each of the search blocks of the search area.

In this case, the controller 180 may control the operating unit 140 to perform the statistical operation using the pixel values of the reference macroblock and the pixels value of the corresponding search block, on the pixels corresponding to the position information. In some implementations, the statistical operation may be limited to the pixels corresponding to the position information. In the operation matrix obtained by the operating unit 140 under the control of the controller 180, the pixels corresponding to the position information should have a statistical operation value while the other remaining pixels may be set as, for example, '0'.

For example, if it is assumed that the controller 180 controls the statistical operation for obtaining the operation matrix as shown in Table 4 according to the position information as shown in Table 8, the values SAD23, SAD33, SAD42, SAD43, SAD44, SAD53 corresponding to the coordinates of (2,3), (3,3), (4,2), (4,3), (4,4), and (5, 4) would be calculated in the operation matrix as shown in Table 4, and values of the other remaining coordinates will be 0.

The moving image wavering correction apparatus 101 and its method according to the second embodiment of the present specification have been described. In some embodiments, the operation of the controller is modified.

First, a moving image wavering correction apparatus according to some embodiments of the present specification has the same configuration as the one illustrated in FIG. 10, except that the function of the controller is modified. For example, the controller, may calculate each difference value between pixel values of a reference macroblock of a previous frame and a macroblock of a current frame, and calculate a portion (i.e., rate) of the pixels whose different value is the same as or larger than a first reference value in the reference macroblock. And, when the calculated rate is larger than a second reference value, the controller substantially controls the operating unit.

Figure 13:
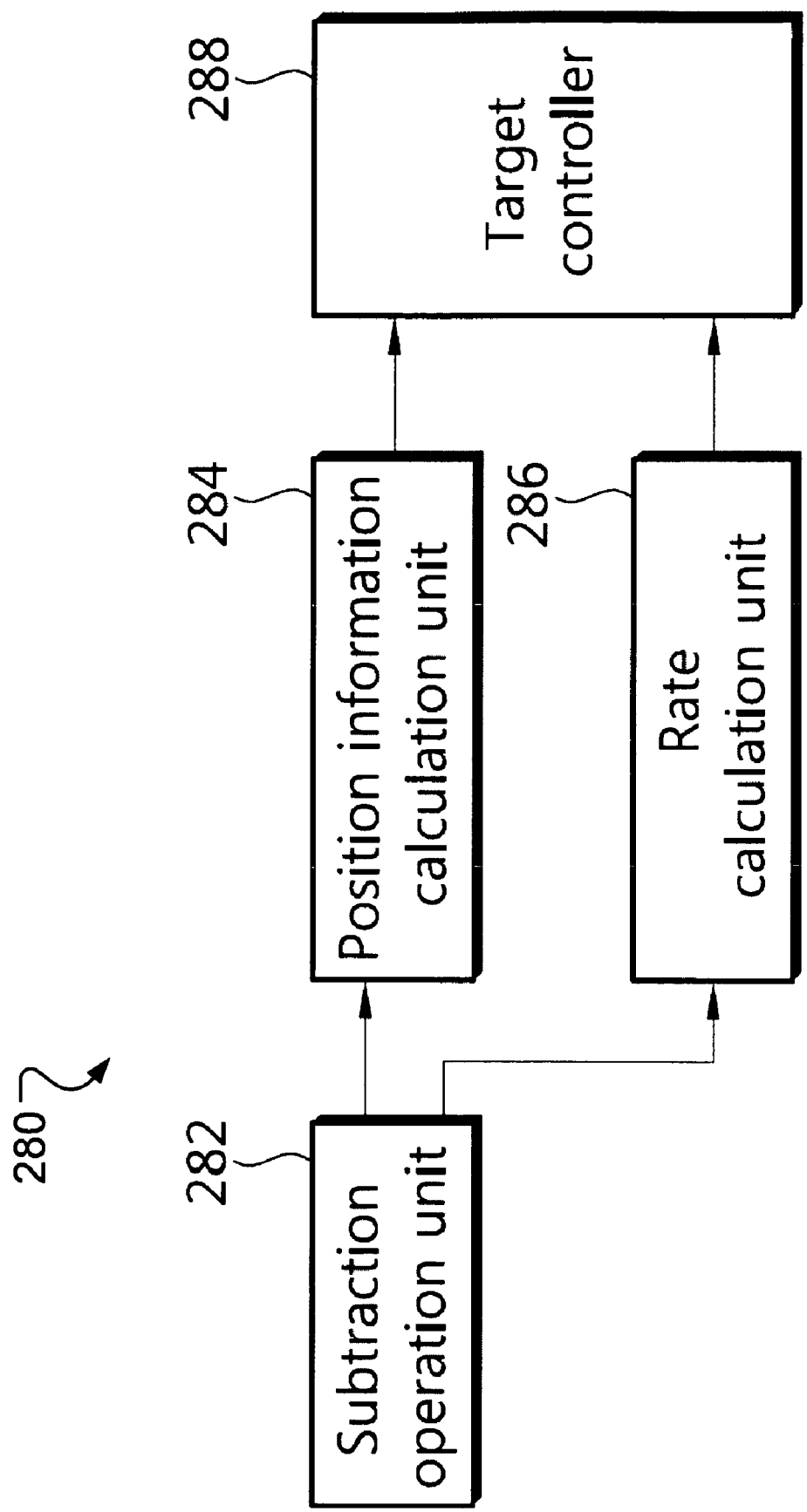
FIG. 13 is a schematic block diagram illustrating a configuration of a controller provided in the apparatus for correcting moving image wavering according to a third embodiment of the present specification.
Figure 14:
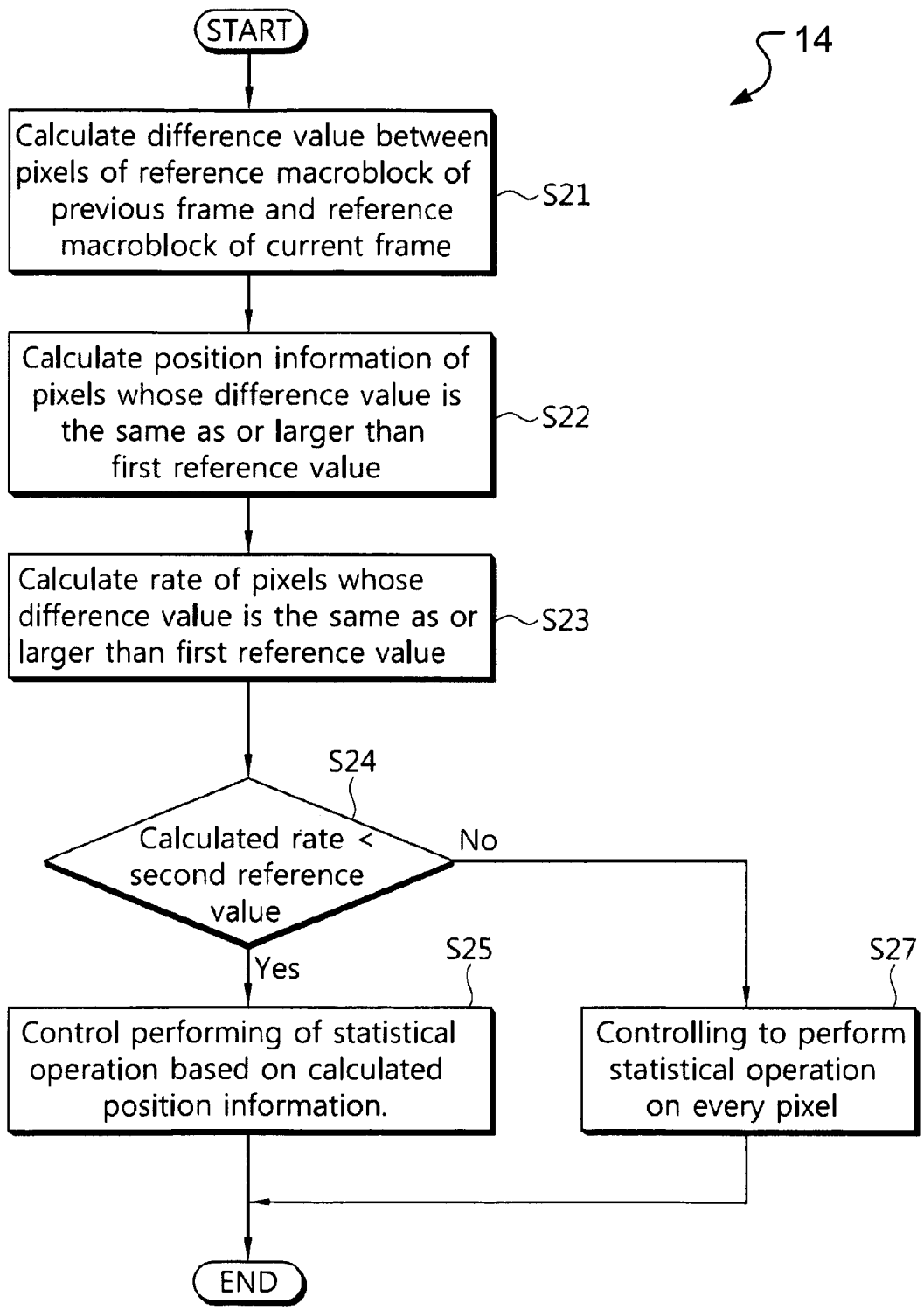
FIG. 14 is a flow chart illustrating the operation of the controller of FIG. 13.

FIG. 13 is a schematic block diagram illustrating the configuration of the controller provided in the moving image wavering correction apparatus, and FIG. 14 is a flow chart illustrating the operation of the controller of FIG. 13.

As shown in FIG. 13, the controller 280 may include a subtraction operation unit 282, a rate calculation unit 286, a position information calculation unit 284, and a target controller 288.

With reference to FIGS. 13 and 14, the subtraction operation unit 282 may load pixel data of the reference macroblock of the previous frame and pixel data of the reference macroblock of the current from the memory 20 to calculate each difference value between pixel values (S21). For example, the subtraction operation unit 282 may load the pixel data of the reference macroblock of the previous frame and the pixel data of the reference macroblock of the current frame from the memory 20, subtract the pixel values of the current value corresponding to pertinent pixels from the pixel values of the reference macroblock of the previous frame, and obtain values by taking absolute values for the result values. In this case, each difference value may be, for example, a difference value of gray levels or the like.

The position information calculation unit 284 compares each difference value between the pixel values calculated by the subtraction operation unit 282 to the pre-set first reference value to calculate position information of pixels whose difference value is the same as or larger than the first reference value (S22).

The rate calculation unit 286 may calculate the portion (i.e., rate) of the pixels whose difference value is the same as or larger than the first reference value in the reference macroblock (S23). For example, in the above case as illustrated in Table 8, the macroblock has a total of 25 pixels of which six pixels have the difference value which is the same as or larger than the particular reference value, so the rate of the pixels whose difference value is the same as or larger than the first reference value is calculated as '24%'.

The target controller 288 compares the calculated rate to the pre-set second reference value (S24). If the calculated rate is smaller than the pre-set second reference value, the target controller 288 may control the operating unit 140 to perform a statistical operation based on the calculated position information (S25). For example, the target controller 288 may store the calculated position information in the memory 20 and control the operating unit 140 to perform the statistical operation only on the pixels corresponding to the stored position information among the pixels of the reference macroblock of the previous frame.

Meanwhile, if the calculated rate is larger than the pre-set second reference value according to the comparison result obtained by comparing the calculated rate and the second reference value, the target controller 188 may control the operating unit 140 to perform the statistical operation on all the pixels included in the reference matrix of the previous frame (S27).

The embodiments in which the controller calculates the pixel values of the macroblock of the previous frame and the macroblock of the current frame at the same position and controls the operating unit have been described. Through such operation of the controller, the amount of calculation can be significantly reduced and the pixels including substantial movement can be accurately discriminated and reflected for a statistical operation.

Meanwhile, in order to control the statistical operation for correction of the current frame, pixel values of macroblocks of the previous frame (i.e., the (N−1)th frame) and a preceding frame (i.e., (N−2)th frame) of the previous frame. For example, the controller may calculate each difference value between pixels of the reference macroblock of the preceding frame and the reference macroblock of the previous frame, detect position information of pixels whose difference value is the same as or larger than the first reference value, and control a statistical operation performed on the current frame based on the position information.

As described above, the technique for correcting moving image wavering according to exemplary embodiments of the present specification has the advantage that an image distorted by wavering can be effectively corrected while the amount of calculation can be considerably reduced.

While this specification contains many specifics, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this application.

What is claimed is:

1. An apparatus for correcting moving image wavering, comprising:
    a selecting unit to select at least one reference macroblock from an input image of a first frame and to select at least one search area from an input image of a second frame, wherein the selected at least one search area corresponds to the at least one reference macroblock selected from the input image of the first frame;
    an operating unit to communicate with the selecting unit and to perform a statistical operation by matching the at least one reference macroblock of the first frame to each of search blocks included in the at least one search area of the second frame;
    a vector calculating unit to communicate with the operating unit and to calculate a motion vector to correct an output image of the second frame based on a resultant value of the statistical operation; and
    an input processing unit to communicate with the selecting unit to receive images of a first and second frames from an external source, downsize the received images from 50% to 70%, and convert pixel values of the downsized images into gray level values to generate the input image of the first frame and the input image of the second frame,
    wherein the operating unit comprises a statistical operation unit to communicate with the first input unit and the second input unit, wherein the statistical operation unit is configured to calculate an operation matrix by performing the statistical operation while shifting the reference macroblock of the first frame in a vertical or horizontal direction such that the reference macroblock corresponds to each search block included in the search area of the second frame, and stores the calculated operation matrix in a memory.

2. The apparatus of claim 1, wherein the at least one search area comprises multiple separated areas spaced apart by a distance from a center of the input image of the second frame.

3. The apparatus of claim 1, wherein the at least one reference macroblock of the first frame is included in at least one search area of the first frame, and the at least one search area of the first frame and the at least one search area of the second frame are positioned at the same coordinates in the input image.

4. The apparatus of claim 1, wherein the selecting unit is configured to store pixel data of the reference macroblock of the first frame and pixel data of the search area of the second frame in a memory.

5. The apparatus of claim 4, wherein the operating unit comprises:
    a first input unit to load the pixel data of the reference macroblock of the first frame stored in the memory; and
    a second input unit to load the pixel data of the search area of the second frame stored in the memory.

6. The apparatus of claim 5, wherein the vector calculating unit is configured to detect a point having a minimum value from the operation matrix calculated through the statistical operation to calculate position information of a matching block among the search blocks included in the at least one search area of the second frame, and calculate the motion vector based on the position information of the calculated matching block.

7. The apparatus of claim 6, wherein the vector calculating unit uses a spiral searching method to search the value of the point in a spiral direction from a central point of the operation matrix in order to detect the point having the minimum value from the operation matrix.

8. The apparatus of claim 1, further comprising:
    a controller to communicate with the selecting unit and the operating unit, wherein the controller is configured to calculate pixel data of a particular macroblock of the first frame and pixel data of a macroblock of the second frame positioned at the same coordinates as the particular macroblock of the first frame, and control the statistical operation performed by the operating unit based on the calculated information.

9. The apparatus of claim 8, wherein the particular macroblock comprises a reference macroblock, and
    the controller comprises:
    a subtraction operation unit to load the pixel data of the reference macroblock of the first frame and pixel data of a reference macroblock of the second frame and calculate each difference value between pixel values of the reference macroblock of the first frame and the reference macroblock of the second frame;
    a position information calculation unit to communicate with the subtraction operation unit to calculate position information of pixels whose difference value is a pre-set reference value or larger; and
    a target controller to communicate with the position information calculation unit to control the operating unit to perform the statistical operation only on the pixels corresponding to the calculated position information among pixels of the reference macroblock of the first frame.

10. The apparatus of claim 8, wherein the particular macroblock comprises a reference macroblock; and
    the controller comprises:
    a subtraction operation unit to load the pixel data of the reference macroblock of the first frame and pixel data of a reference macroblock of the second frame and calculate each difference value between pixel values of the reference macroblock of the first frame and the reference macroblock of the second frame;

a position information calculation unit to communicate with the subtraction operation unit to calculate position information of a pixel whose different value is the same as or larger than a pre-set first reference value;

a rate calculation unit to communicate with the subtraction operation unit to calculate a rate of the pixel whose difference value is the same as or larger than the pre-set first reference value, in the reference macroblock; and a target controller to communicate with the position information calculation unit and the rate calculation unit to control the operating unit to perform the statistical operation on only pixels corresponding to the position information among the pixels of the reference macroblock of the first frame when detecting that the calculated rate is smaller than a pre-set second reference value, and control the operating unit to perform the statistical operation on all the pixels of the reference macroblock of the first frame when detecting that the rate is the same as or larger than the pre-set second reference value.

11. The apparatus of claim 1, further comprising:
a controller to communicate with the selecting unit and the operating unit to calculate pixel data of a particular macroblock of the first frame and pixel data of a macroblock of a preceding frame of the first frame positioned at the same coordinates as the particular macroblock of the first frame, and control the statistical operation performed by the operating unit based on the calculated information.

12. The apparatus of claim 1, wherein the input processing unit comprises:
an image receiving unit to receive the images of the first and second frames from an image capturing unit;
an input scaler unit to communicate with the image receiving unit to lower resolution of the received images of the first and second frames; and
an information conversion unit to communicate with the input scaler unit to convert the pixel values of the images processed by the input scaler unit into the gray level values.

13. The apparatus of claim 1, further comprising:
an output scaler unit to receive the images of the first and second frames from an external source and downsize the received images into a size of output images.

14. The apparatus of claim 13, further comprising:
a correcting unit to communicate with the output scaler unit to correct the output image of the second frame downsized by the output scaler unit based on the calculated motion vector.

15. A method for correcting moving image wavering, comprising:
selecting at least one reference macroblock from an input image of a first frame;
selecting at least one search area from an input image of a second frame, wherein the at least one search area corresponds to the at least on reference macroblock;
performing a statistical operation by matching the at least one reference macroblock of the first frame to each of search blocks included in the at least one search area of the second frame; and
calculating a motion vector to correct an output image of the second frame based on a resultant value of the statistical operation;
receiving images of a first and second frames from an external source, downsizing the received images from 50% to 70%, and converting pixel values of the downsized images into gray level values to generate the input image of the first frame and the input image of the second frame,
wherein performing the statistical operation comprises calculating an operation matrix by performing the statistical operation while shifting the reference macroblock of the first frame in a vertical or horizontal direction such that the reference macroblock corresponds to each search block included in the search area of the second frame, and storing the calculated operation matrix in a memory.

16. The method of claim 15, further comprising:
loading pixel data of the at least one reference macroblock of the first frame;
loading at least one reference macroblock of the second frame positioned at the same coordinates as the at least one reference macroblock of the first frame;
calculating information including the loaded pixel data of the at least one reference macroblock of the first frame and the loaded at least one reference macroblock of the second frame; and
controlling the statistical operation based on the calculated information.

17. The method of claim 16, wherein calculating the pixel data comprises:
calculating each difference value between pixel values of the reference macroblocks of the first and second frames;
comparing the calculated difference values to a first reference value; and
calculating position information of pixels whose calculated difference value is the same as or larger than the first reference value.

18. The method of claim 17, wherein controlling the statistical operation comprises:
controlling the statistical operation only on the pixels corresponding to the position information among the pixels of the reference macroblock of the first frame.

19. The method of claim 17, wherein calculating the pixel data comprises:
calculating a rate of the pixels whose calculated difference value is the same as or larger than the first reference value in the reference macroblock; and
comparing the calculated rate to a second reference value, wherein controlling the statistical operation comprises:
controlling the statistical operation by using at least one of resultant information obtained by comparing the calculated rate to the second reference value and the calculated position information.

* * * * *